US011616640B2

(12) United States Patent
Hu et al.

(10) Patent No.: US 11,616,640 B2
(45) Date of Patent: Mar. 28, 2023

(54) METHOD FOR ENCRYPTION AND DECRYPTION, PROGRAMMABLE SWITCH AND COMPUTER PROGRAM PRODUCT

(71) Applicant: EMC IP Holding Company LLC, Hopkinton, MA (US)

(72) Inventors: Chenxi Hu, Beijing (CN); Shixu Dong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 151 days.

(21) Appl. No.: 16/820,122

(22) Filed: Mar. 16, 2020

(65) Prior Publication Data

US 2021/0243016 A1   Aug. 5, 2021

(30) Foreign Application Priority Data

Jan. 31, 2020   (CN) .......................... 202010077760.8

(51) Int. Cl.
*H04L 9/08*   (2006.01)
*H04L 9/14*   (2006.01)
*G16Y 10/75*   (2020.01)
*G16Y 30/10*   (2020.01)

(52) U.S. Cl.
CPC .............. *H04L 9/0819* (2013.01); *H04L 9/14* (2013.01); *G16Y 10/75* (2020.01); *G16Y 30/10* (2020.01)

(58) Field of Classification Search
CPC ......... H04L 9/0819; H04L 9/14; G16Y 30/10; G16Y 10/75
See application file for complete search history.

(56) References Cited

U.S. PATENT DOCUMENTS

| 10,382,203 | B1* | 8/2019 | Loladia | .................. | H04L 63/06 |
| 2015/0023503 | A1* | 1/2015 | Baek | .................. | H04W 12/041 |
| | | | | | 380/270 |
| 2016/0105279 | A1* | 4/2016 | Zheng | ...................... | H04L 9/14 |
| | | | | | 713/171 |
| 2017/0033924 | A1* | 2/2017 | Jain | ...................... | H04L 9/0819 |

(Continued)

FOREIGN PATENT DOCUMENTS

| CN | 104301303 A | 1/2015 |
| CN | 107959686 A | 4/2018 |
| CN | 109995843 A | 7/2019 |

*Primary Examiner* — Noura Zoubair
*Assistant Examiner* — Zoha Piyadehghibi Tafaghodi
(74) *Attorney, Agent, or Firm* — Ryan, Mason & Lewis, LLP

(57) ABSTRACT

Embodiments of the present disclosure relate to a method for encryption and decryption, a programmable switch, and a computer program product. The method comprises receiving, at a programmable switch, encrypted data to be sent to a certain Internet of Things (IoT) device, wherein the encrypted data is encrypted using a public key of the programmable switch. The method further comprises decrypting the encrypted data using a private key of the programmable switch to obtain decrypted data, and then sending the decrypted data from the programmable switch to the IoT device. According to the embodiments of the present disclosure, the encryption and decryption operations of the IoT device can be transferred to the programmable switch for processing, and the programmable switch is used to help the IoT device perform encryption and decryption.

20 Claims, 10 Drawing Sheets

(56) References Cited

U.S. PATENT DOCUMENTS

| | | | |
|---|---|---|---|
| 2017/0111328 A1* | 4/2017 | Leon | H04L 9/30 |
| 2017/0118180 A1* | 4/2017 | Takahashi | H04L 9/0819 |
| 2017/0118196 A1 | 4/2017 | Ponsini et al. | |
| 2017/0171196 A1* | 6/2017 | Britt | H04W 12/06 |
| 2017/0359317 A1* | 12/2017 | Anderson | G06F 21/602 |
| 2018/0019983 A1* | 1/2018 | Tissot | G06F 21/602 |
| 2018/0167366 A1* | 6/2018 | Cammarota | H04L 63/0428 |
| 2018/0309580 A1* | 10/2018 | Jeon | H04W 4/70 |
| 2018/0343238 A1* | 11/2018 | Tola | H04L 63/0421 |
| 2019/0097793 A1* | 3/2019 | Nix | H04L 9/006 |
| 2019/0253243 A1* | 8/2019 | Zimmerman | H04L 9/3247 |
| 2019/0312719 A1* | 10/2019 | Cheon | H04L 9/0861 |

* cited by examiner

METHOD FOR ENCRYPTION AND DECRYPTION, PROGRAMMABLE SWITCH AND COMPUTER PROGRAM PRODUCT

RELATED APPLICATION(S)

The present application claims priority to Chinese Patent Application No. 202010077760.8, filed Jan. 31, 2020, and entitled "Method for Encryption and Decryption, Programmable Switch and Computer Program Product," which is incorporated by reference herein in its entirety.

FIELD

Embodiments of the present disclosure generally relate to the field of data encryption, and more particularly to a method for encryption and decryption, a programmable switch, and a computer program product.

BACKGROUND

The Internet of Things (IoT) is a network extended and expanded based on the Internet. It combines a variety of information sensing devices and the Internet to form a huge network, thus realizing interconnection among people, machines and objects at any time and at any place. IoT devices refer to various terminal devices in the IoT network that can be connected to the network, for example, smart personal devices, smart home devices, smart cars, smart city facility devices, and so on.

A switch is a network device used for electrical or optical signal forwarding. It can provide an exclusive electrical or optical signal path for any two network nodes that access the switch. Common switches are Ethernet switches. Other common switches include telephone voice switches, fiber switches, or the like. Generally speaking, IoT devices can be connected to the Internet via edge switches.

SUMMARY

Embodiments of the present disclosure provide a method for encryption and decryption, a programmable switch, and a computer program product.

In one aspect of the present disclosure, a method for encryption and decryption is provided. The method comprises receiving, at a programmable switch, encrypted data directed to an Internet of Things (IoT) device, wherein the encrypted data is encrypted using a public key of the programmable switch. The method further comprises decrypting the encrypted data using a private key of the programmable switch to obtain decrypted data, and sending the decrypted data from the programmable switch to the IoT device.

In another aspect of the present disclosure, a programmable switch is provided. The programmable switch comprises a processing unit and a memory, wherein the memory is coupled to the processing unit and stores instructions. The instructions, when executed by the processing unit, perform the following actions: receiving, at a programmable switch, encrypted data directed to an Internet of Things (IoT) device, wherein the encrypted data is encrypted using a public key of the programmable switch, decrypting the encrypted data using a private key of the programmable switch to obtain decrypted data, and sending the decrypted data from the programmable switch to the IoT device.

In yet another aspect of the present disclosure, a computer program product is provided. The computer program product is tangibly stored on a non-transitory computer-readable medium and contains computer-executable instructions that, when executed, cause a computer to implement the method or process according to an embodiment of the present disclosure.

This summary is provided to introduce the selection of concepts in a simplified form, which will be further described in the detailed description below. The summary is neither intended to identify key features or main features of the present disclosure, nor intended to limit the scope of various embodiments of the present disclosure.

BRIEF DESCRIPTION OF THE DRAWINGS

The foregoing and other objectives, features, and advantages of the present disclosure will become more apparent from more detailed description of the example embodiments of the present disclosure in conjunction with the accompanying drawings. In the example embodiments of the present disclosure, identical reference numerals usually represent identical elements.

DETAILED DESCRIPTION

Figure 1:
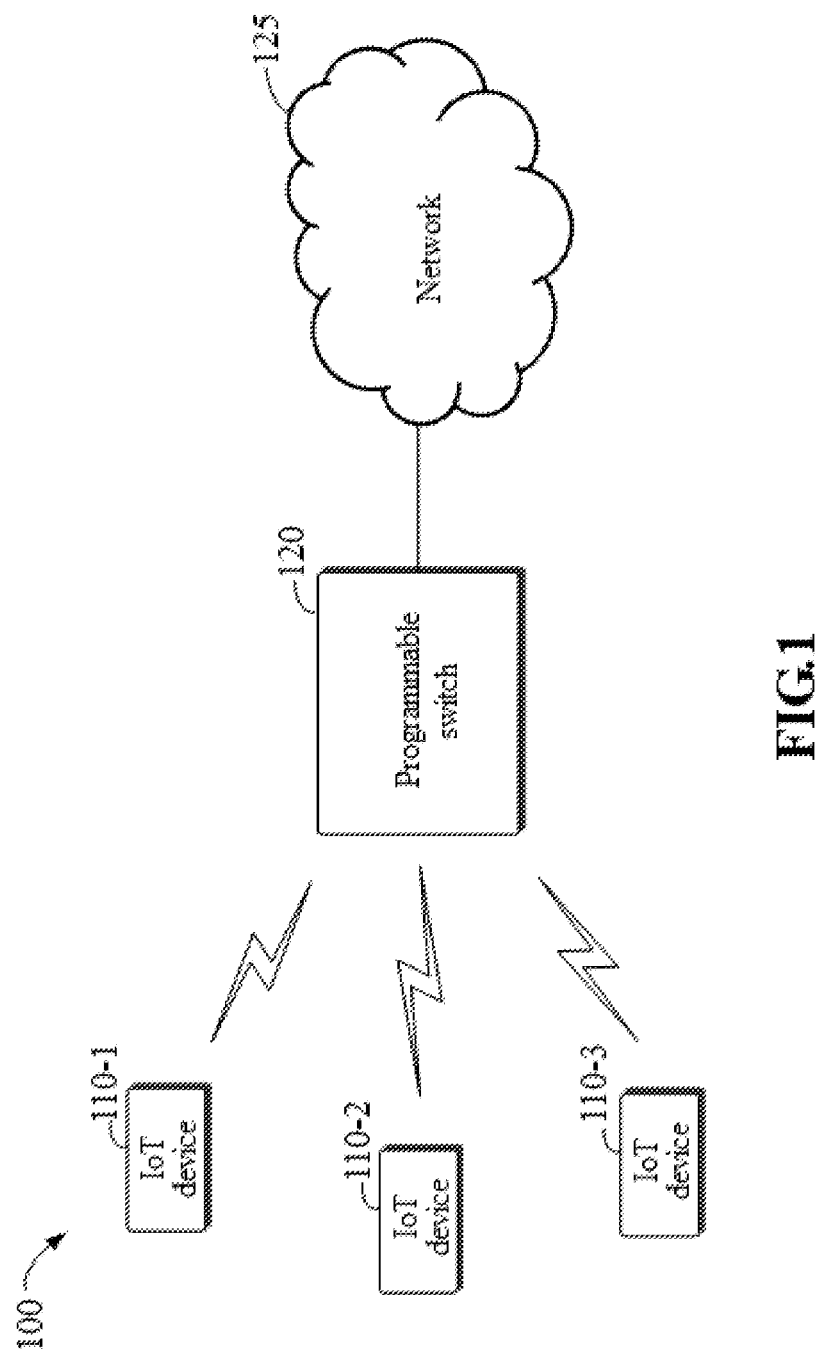
FIG. 1 shows a schematic diagram of an example IoT environment according to an embodiment of the present disclosure.

Preferred embodiments of the present disclosure will be described in more detail hereinafter with reference to the accompanying drawings. Although some specific embodiments of the present disclosure are shown in the accompanying drawings, it should be understood that the present disclosure can be implemented in a variety of forms and should not be limited by the embodiments set forth herein. But rather, these embodiments are provided so that the present disclosure will be more thorough and complete, and will be able to fully convey the scope of the present disclosure to those skilled in the art.

As used herein, the term "comprise/include" and variations thereof mean open inclusion, i.e., "comprising/including but not limited to." Unless specifically stated, the term "or" means "and/or." The term "based on" means "based at least in part on." The terms "one example embodiment" and "one embodiment" mean "at least one example embodiment." The term "another embodiment" means "at least one additional embodiment." The terms "first," "second," and the like may refer to different or identical objects unless explicitly indicated to be different.

Generally speaking, in order to ensure the security of communication between devices, it is usually necessary to encrypt transmitted data and then perform corresponding decryption at a receiving end. IoT devices often need to perform encryption and decryption operations when communicating with other network devices. However, we have found that there are problems in the following several aspects when performing encryption and decryption operations using an IoT device.

First, the computing power in an IoT device is usually weak. Considering cost, IoT devices can use embedded CPUs to meet basic computing and communication requirements. There are usually no additional resources available to speed up encryption and decryption operations. Due to limited computing resources, IoT devices cannot handle encryption and decryption quickly. As a result, high latency and low throughput will be caused when communicating with IoT devices through security mechanisms.

Second, some old IoT devices did not use encryption and decryption authentication mechanisms for security design. With the security requirements for IoT devices, many IoT devices are designed to support identity authentication. However, there are many old IoT devices that do not support identity authentication. These IoT devices do not have basic security mechanisms to protect themselves, and therefore are at risk of being attacked.

Third, there is a conflict between security and communication speed. The traditional way of secure communication depends on complex calculations on a terminal device. If the terminal device does not have a fast CPU or a coprocessor for executing a security algorithm, the communication speed cannot be guaranteed. In some high-speed environments, designers must reduce the level of security for IoT devices to balance performance and communication speed.

It can be seen that the traditional method uses the IoT device itself to perform encryption and decryption operations, which takes a long time and causes a large latency.

To this end, the embodiments of the present disclosure propose a new solution using a programmable switch to help an IoT device perform encryption and decryption operations. According to the embodiments of the present disclosure, the encryption and decryption operations of the IoT device can be transferred to the programmable switch for processing, and the programmable switch is used to help the IoT device perform encryption and decryption. Since the programmable switch has stronger processing capabilities (such as computing resources, storage resources, etc.) than the IoT device, the embodiments of the present disclosure can speed up the execution of asymmetric encryption and decryption and reduce transmission latency. In addition, for IoT devices that do not support asymmetric encryption and decryption functions, the programmable switch according to the embodiments of the present disclosure can also ensure secure communication of the IoT devices.

The basic principle and several example implementations of the present disclosure are illustrated below with reference to FIGS. 1 to 9. It should be understood that these example embodiments are given merely to enable those skilled in the art to better understand and then implement the embodiments of the present disclosure, rather than limiting the scope of the present disclosure by any means.

FIG. 1 shows a schematic diagram of example IoT environment 100 according to an embodiment of the present disclosure. As shown in FIG. 1, multiple IoT devices 110-1, 110-2, and 110-3 (collectively referred to as "IoT device 110") can be wirelessly connected to programmable switch 120, and programmable switch 120 is then connected to network 125. Of course, one or more IoT devices may also be wired to programmable switch 120. IoT device 110 may include, but is not limited to, an air-conditioning controller, a smart lock, a traffic light, a web camera, and so on.

In some embodiments, programmable switch 120 may be an edge switch, which can provide some serverless functions, such as RSA encryption and RSA decryption. The difference between programmable switch 120 and a traditional switch is that programmable switch 120 can be flexibly reprogrammed with new features and functions which are not limited to network-related functions. The program of the programmable switch, for example, can be written in a P4 programming language and supports online update to the programmable switch. IoT device 110 may utilize a serverless function provided by programmable switch 120. By using advantages of programmable switch 120, serverless functions can be implemented on the switch to help IoT devices perform encryption and decryption operations, such as RSA encryption and decryption.

RSA is one of the earliest public key encryption systems, and it is widely used for secure data transmission. In such an encryption system, the encryption key is public and is different from the decryption key that is kept private (privately-owned). In RSA, this asymmetry is based on the practical difficulty of factoring the product of two large prime numbers, namely, the "factorization problem." A user of RSA creates and publishes a public key based on two large prime numbers and an auxiliary value. The prime numbers must be kept secret. Anyone can use a public key to encrypt a message, but only someone who knows the prime numbers can decrypt the message. Generally speaking, if a sufficiently large key is used, there is currently no known method to crack the RSA algorithm. However, RSA is a relatively slow algorithm, so it is not often used to directly encrypt user data. More commonly, RSA is used for encryption sharing of symmetric key encryption, so that batch encryption-decryption operations can be performed at a higher speed.

For example, randomly select two different prime numbers p and q. Multiply p and q and denote it as p*q. Calculate a Euler function $\varphi(n)$ of n. The Euler function proves that when p and q are different prime numbers, $\varphi(n)=(p-1)*(q-1)$. Randomly select an integer e, such that two conditions are satisfied: $\varphi(n)$ and e are coprime, and $1<e<\varphi(n)$. Calculate a modular multiplicative inverse d of e for $\varphi(n)$; that is, find a d satisfying ed=1 mod $\varphi(n)$. This formula is equivalent to ed−1=k$\varphi(n)$, which is actually to find an integer solution of (d,k) for the equation ed−1=k$\varphi(n)$. This equation can be solved using an extended Euclidean algorithm. Finally, (e,n) is packaged as a public key, and (d,n) is packaged as a private key. Therefore, for plaintext M where M<n, the corresponding RSA ciphertext is $C=M^e$ mod n. For ciphertext C, the corresponding M is $M=C^d$ mod n.

It should be understood that although some embodiments of the present disclosure use RSA as an example of asymmetric encryption, any other asymmetric encryption algorithms currently existing or to be developed in the future can also be used in combination with the embodiments of the present disclosure.

Figure 2:
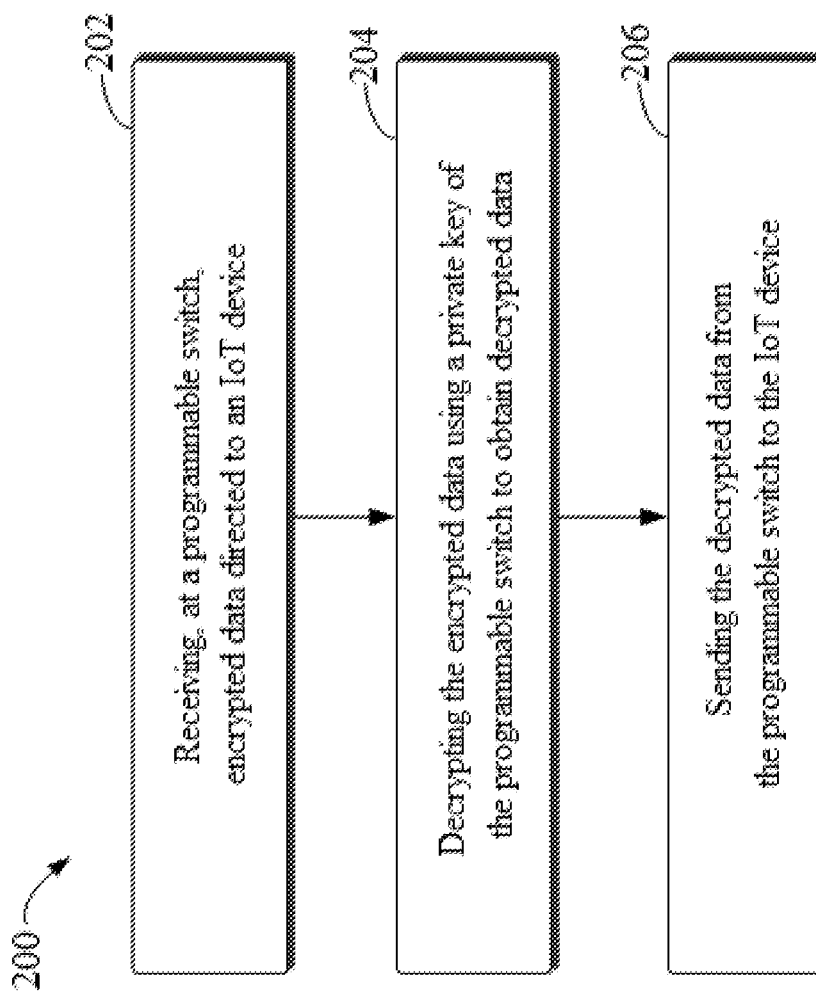
FIG. 2 shows a flowchart of a method for asymmetric encryption and decryption according to an embodiment of the present disclosure.

FIG. 2 shows a flowchart of method 200 for encryption and decryption according to an embodiment of the present disclosure. It should be understood that method 200 may be implemented by programmable switch 120 described with reference to FIG. 1.

At 202, encrypted data directed to an IoT device is received at a programmable switch, wherein the encrypted data is encrypted using a public key of the programmable switch. For example, programmable switch 120 described with reference to FIG. 1 receives encrypted data sent from the network to one of IoT devices 110. According to an embodiment of the present disclosure, programmable switch 120 does not simply forward data directly, but decrypts the data transmitted to the IoT device.

At 204, the encrypted data is decrypted using a private key of the programmable switch to obtain decrypted data. For example, since the encrypted data is encrypted using a public key of programmable switch 120, according to the asymmetric encryption principle, a private key of programmable switch 120 can be used to decrypt the encrypted data to obtain the original data. Since the private key of programmable switch 120 is only known by itself, other devices cannot intercept and obtain the original data.

At 206, the decrypted data is sent from the programmable switch to the IoT device. For example, programmable switch 120 transmits the decrypted data to the corresponding IoT device 110. Because programmable switch 120 and IoT device 110 are in a trusted connection, even if the data transmitted between them is not encrypted, there is usually no security risk.

Therefore, according to method 200 of the embodiments of the present disclosure, the encryption and decryption operations of the IoT device can be transferred to the programmable switch for processing, and the programmable switch is used to help the IoT device perform encryption and decryption. Since the programmable switch has stronger processing capabilities than the IoT device, the embodiments of the present disclosure can speed up the execution of asymmetric encryption and decryption and reduce latency. In addition, for IoT devices that do not support asymmetric encryption and decryption functions, the programmable switch according to the embodiments of the present disclosure can also ensure secure communication of the IoT devices.

In addition, according to some embodiments of the present disclosure, a method for providing a serverless function of RSA encryption and decryption on an edge device of a programmable switch is proposed. Most IoT devices have low power consumption and very limited computing resources. Secure communication of IoT devices is essential, which needs to overcome the lack of ability to perform complex encryption and decryption methods for IoT devices. With the help of programmable switches, the serverless function of the RSA algorithm can be implemented on edge devices, which will help IoT devices meet security requirements. Embodiments of the present disclosure can help transfer RSA algorithms from IoT devices to programmable switches, thereby reducing latency from milliseconds to microseconds.

Figure 3:
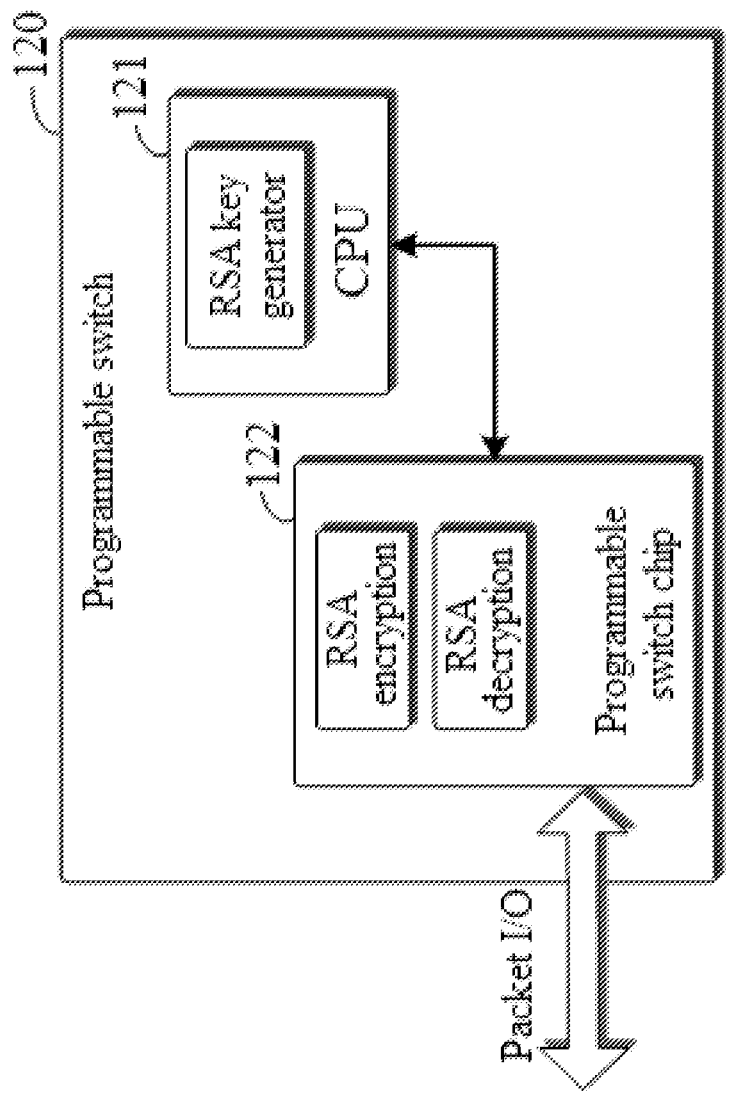
FIG. 3 shows a schematic diagram of an example architecture of a programmable switching technology according to an embodiment of the present disclosure.

FIG. 3 shows a schematic diagram of an architecture of a programmable switching technology according to an embodiment of the present disclosure. As shown in FIG. 3, programmable switch 120 comprises CPU 121 and programmable switch chip 122. CPU 121 may comprise an RSA key generator for generating an asymmetric key, wherein the asymmetric key includes a key pair comprising a public key and a private key. Programmable switch chip 122 may be configured to perform RSA encryption and RSA decryption on a passing packet. With deployment of an RSA key generator on CPU 121 and deployment of RSA encryption and decryption on programmable switch chip 122, it is possible to use the programmable switch chip hardware to obtain better processing performance.

Figure 4:
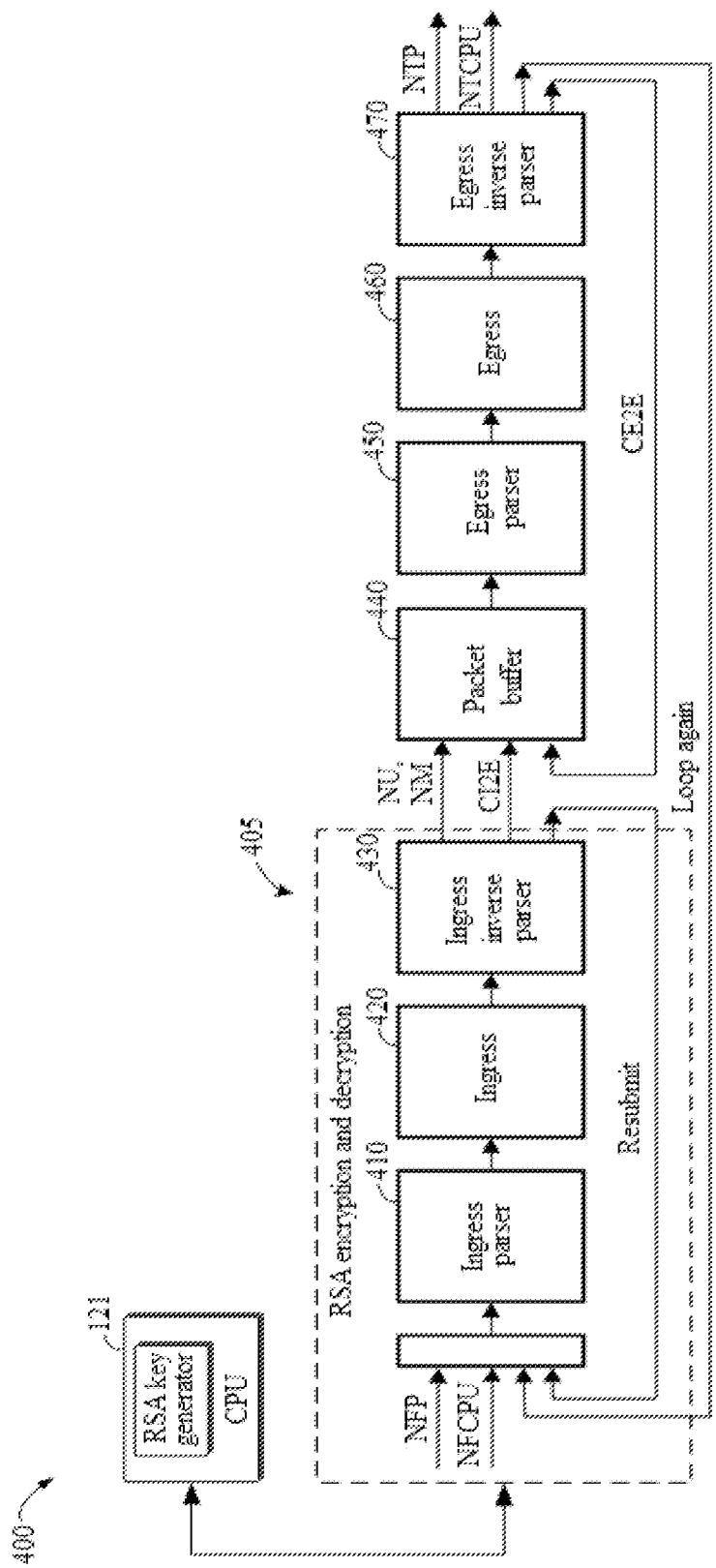
FIG. 4 shows a schematic diagram of an example processing process in a programmable switching technology according to an embodiment of the present disclosure.

FIG. 4 shows a schematic diagram of example processing process 400 in a programmable switching technology according to an embodiment of the present disclosure. As shown in FIG. 4, NFP represents a normal packet from a port, NFCPU represents a packet from a CPU port, NU represents a normal unicast packet from an ingress to an egress, NM represents a normal multicast packet from the ingress to the egress, CI2E represents a clone from the ingress to the egress, CE2E represents a clone from the egress to the egress, NTP represents a normal packet to the port, and NTCPU represents a normal packet to the CPU port.

As shown in FIG. 4, a packet is sequentially processed in the following order: ingress parser 410, ingress 420, ingress inverse parser 430, packet buffer 440, egress parser 450, egress 460, and egress inverse parser 470. After the processing by ingress inverse parser 430 is completed, it may be resubmitted, and after the processing by egress inverse parser 470 is completed, the loop may be performed again. As indicated by 405, RSA encryption and decryption mainly focus on the ingress processing part. By using a public and/or private key generated by an RSA key generator, the IoT device can be replaced to complete the RSA encryption and/or decryption operations.

Figure 5A:
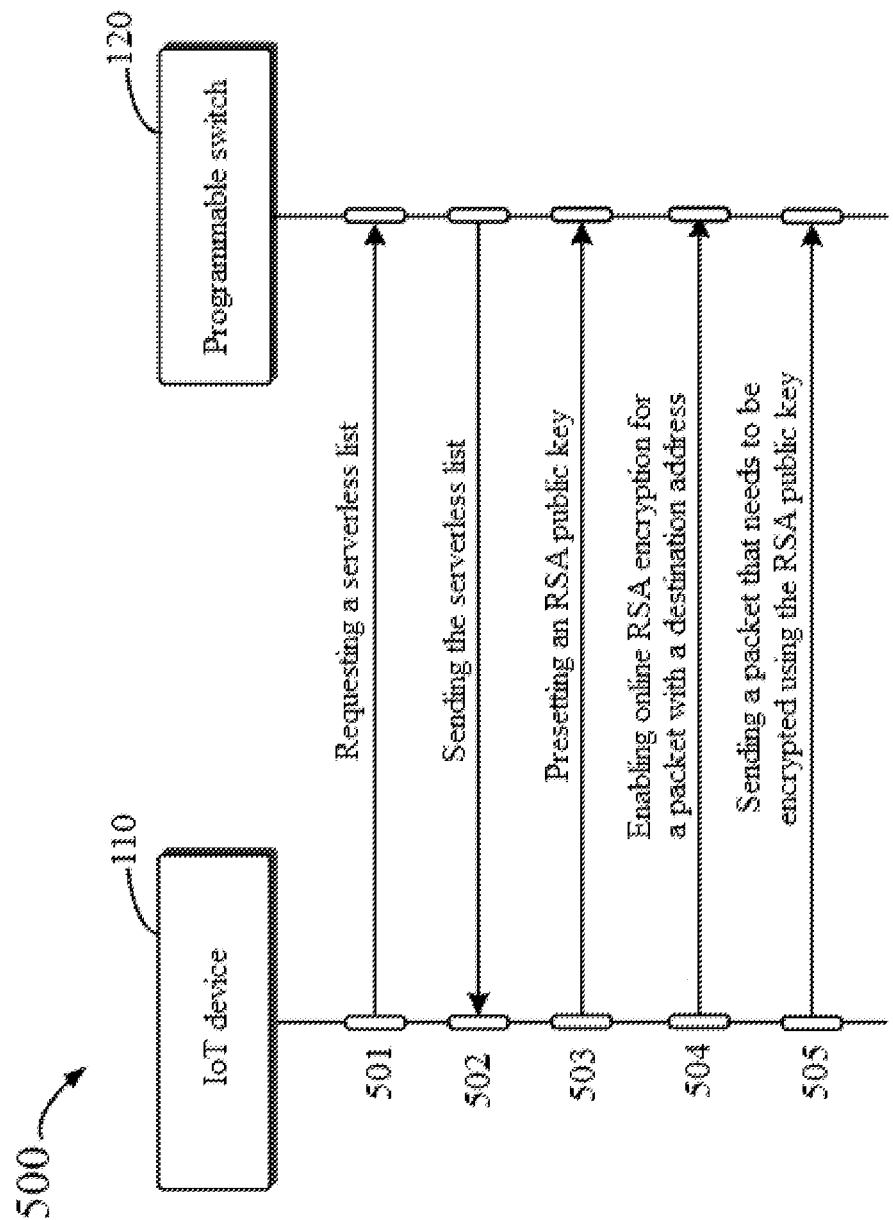
FIGS. 5A-5B show schematic diagrams of a process of requesting a serverless list according to an embodiment of the present disclosure.
Figure 5B:
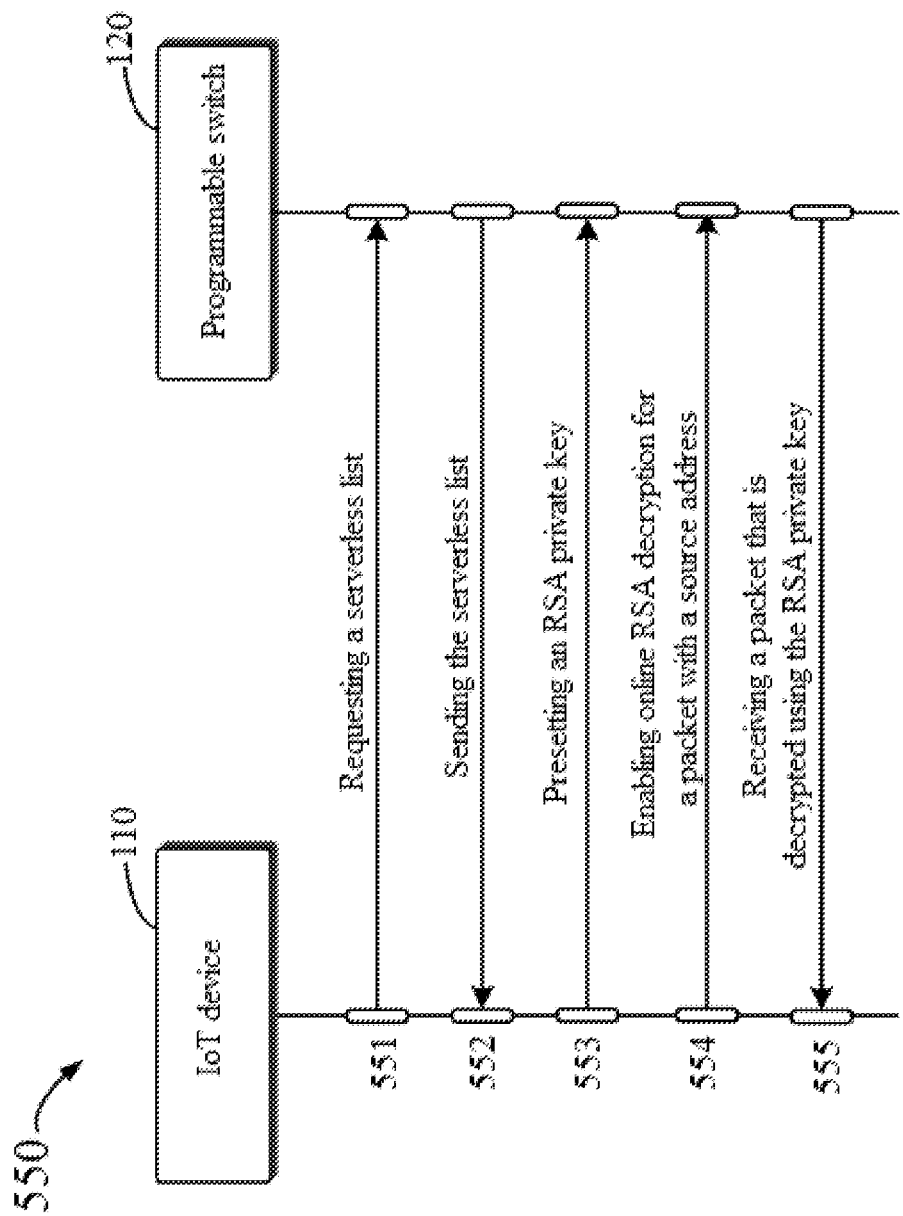

FIGS. 5A-5B show schematic diagrams of a process of requesting a serverless list according to an embodiment of the present disclosure. In order to enable the IoT device to conveniently utilize the RSA encryption and decryption functions provided by the programmable switch, a serverless function interface can be designed for communication between the IoT device and the programmable switch. IoT devices can discover, by requesting a serverless list, the serverless functions that a programmable switch can provide. After the IoT device finds that the programmable switch on the edge supports the RSA algorithm, it will preset its public or private key to the programmable switch to perform packet encryption and decryption operations on the programmable switch side. By specifying a destination IP address or a source IP address, the programmable switch can filter out packets that should not be encrypted or decrypted.

FIG. 5A shows process 500 of completing RSA encryption by programmable switch 120 in place of an IoT device. As shown in FIG. 5A, IoT device 110 sends (501) a request to programmable switch 120 to request a serverless list. Programmable switch 120 sends (502) a serverless list to IoT device 110. IoT device 110 may preset (503) an RSA public key, and set (504) to enable an online RSA encryption function for a packet with a destination address. IoT device 110 sends a packet (505) that needs to be encrypted using the RSA public key to programmable switch 120, and programmable switch 120 performs a corresponding encryption process.

FIG. 5B shows process 550 of completing RSA decryption by programmable switch 120 in place of an IoT device. As shown in FIG. 5B, IoT device 110 sends (551) a request to programmable switch 120 to request a serverless list. Programmable switch 120 sends (552) a serverless list to IoT device 110. IoT device 110 may preset (553) an RSA private key, and set (554) to enable an online RSA decryption function for a packet with a source address. When receiving the packet with the source address, programmable switch 120 performs a corresponding decryption process, and IoT device 110 receives (555) from programmable switch 120 the packet decrypted using the RSA private key.

By utilizing the programmability of the programmable switch and the assumption of a secure connection between the IoT device and the programmable switch, the embodiments of the present disclosure transfer the calculation of the RSA algorithm from the IoT device to the programmable switch. For example, the workload can be transferred to the programmable switch, and when a data packet passes through the programmable switch, the payload in the data packet can be encrypted or decrypted using the RSA algorithm.

Figure 6:
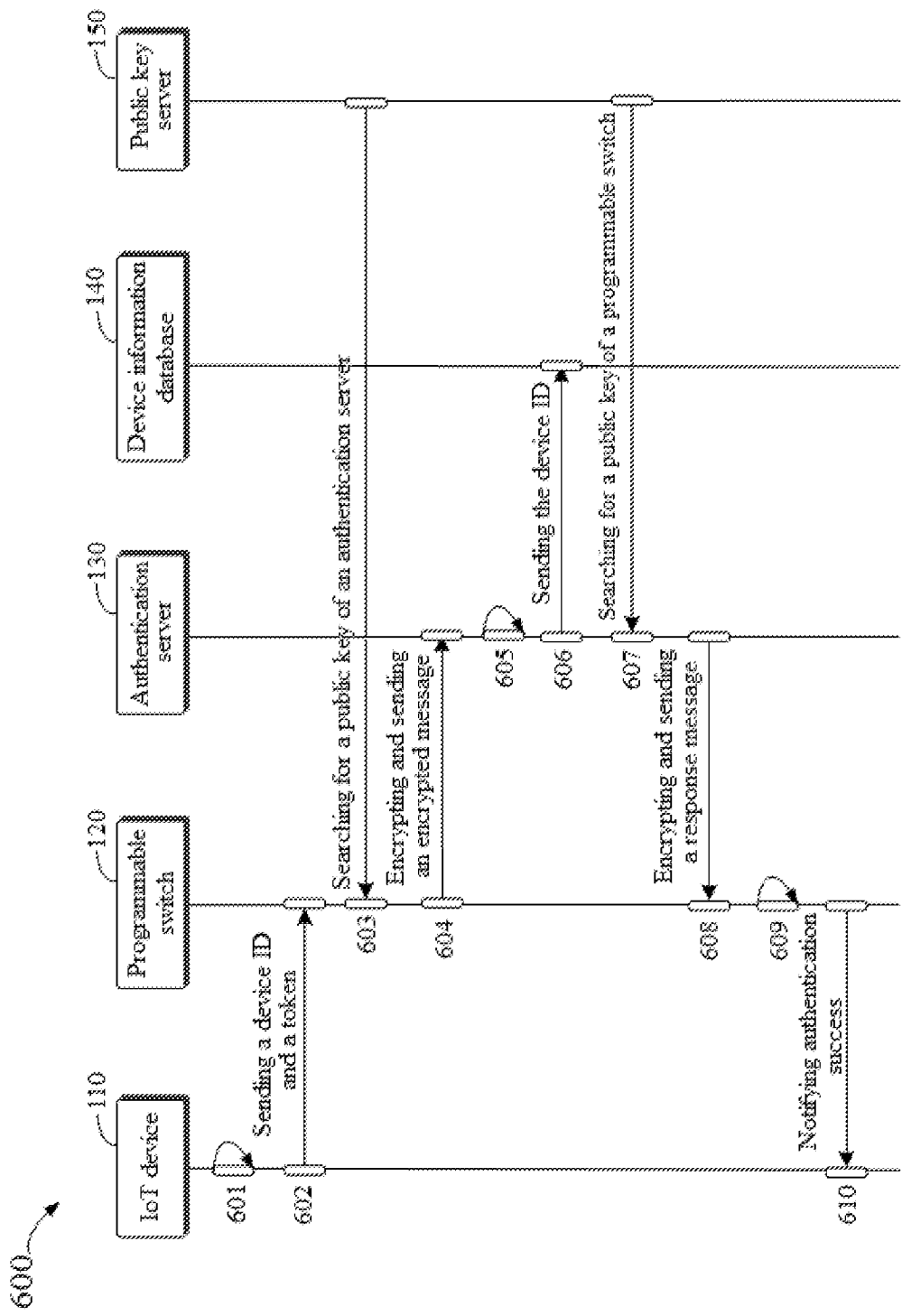
FIG. 6 shows a schematic diagram of an example process of online authentication of an IoT device according to an embodiment of the present disclosure.

FIG. 6 shows a schematic diagram of example process 600 for online authentication of IoT devices according to an embodiment of the present disclosure, which shows a method of RSA authentication designed using a programmable switch, wherein the RSA algorithm is executed on programmable switch 120 instead of IoT device 110.

Referring to FIG. 6, IoT device 110 obtains (601) a token for authentication, wherein the token may be generated by an RSA token generator, and then transmitted to IoT device 110 through user input or the like.

IoT device 110 sends (602) its device identifier (ID) and token to programmable switch 120 for use in access right authentication.

Programmable switch 120 searches for (603) a public key of authentication server 130 from public key server 150, wherein public key server 150 stores a large number of device public keys.

Programmable switch 120 uses the public key of authentication server 130 to encrypt the device ID and the token, and sends (604) the encrypted message to authentication server 130.

Authentication server 130 uses its private key to decrypt (605) the encrypted message to obtain the device ID and the token, and then authentication server 130 checks whether the token is correct. If the token is incorrect, the authentication on the IoT device fails.

If the token is correct, authentication server 130 sends (606) the device ID to device information database 140, wherein information database 140 stores basic information, such as ID, of IoT devices that have been authenticated.

Authentication server 130 searches for (607) a public key of programmable switch 120 from public key server 150.

Authentication server 130 uses the public key of programmable switch 120 to encrypt the device ID and the "success" indication, and sends (608) an authentication response message to programmable switch 120.

After receiving the authentication response message, programmable switch 120 uses its private key to decrypt (609) the authentication response message, thereby obtaining an indication that the authentication is successful. Programmable switch 120 may then grant an access right to the IoT device and store the device ID and a corresponding connection port locally.

Programmable switch 120 then sends (610) a notification of successful authentication to IoT device 110 to notify the IoT device that it is granted access right. So far, IoT device 110 has successfully completed the authentication process.

Traditionally, although RSA authentication on IoT devices is also achievable, it is very slow, usually taking tens or even hundreds of milliseconds. Once the computing resources on IoT devices are limited, the RSA authentication is very slow in some usage scenarios. In contrast, the embodiments of the present disclosure use a programmable switch, instead of an IoT device, to perform online authentication, which can increase the authentication speed of the IoT device.

Figure 7:
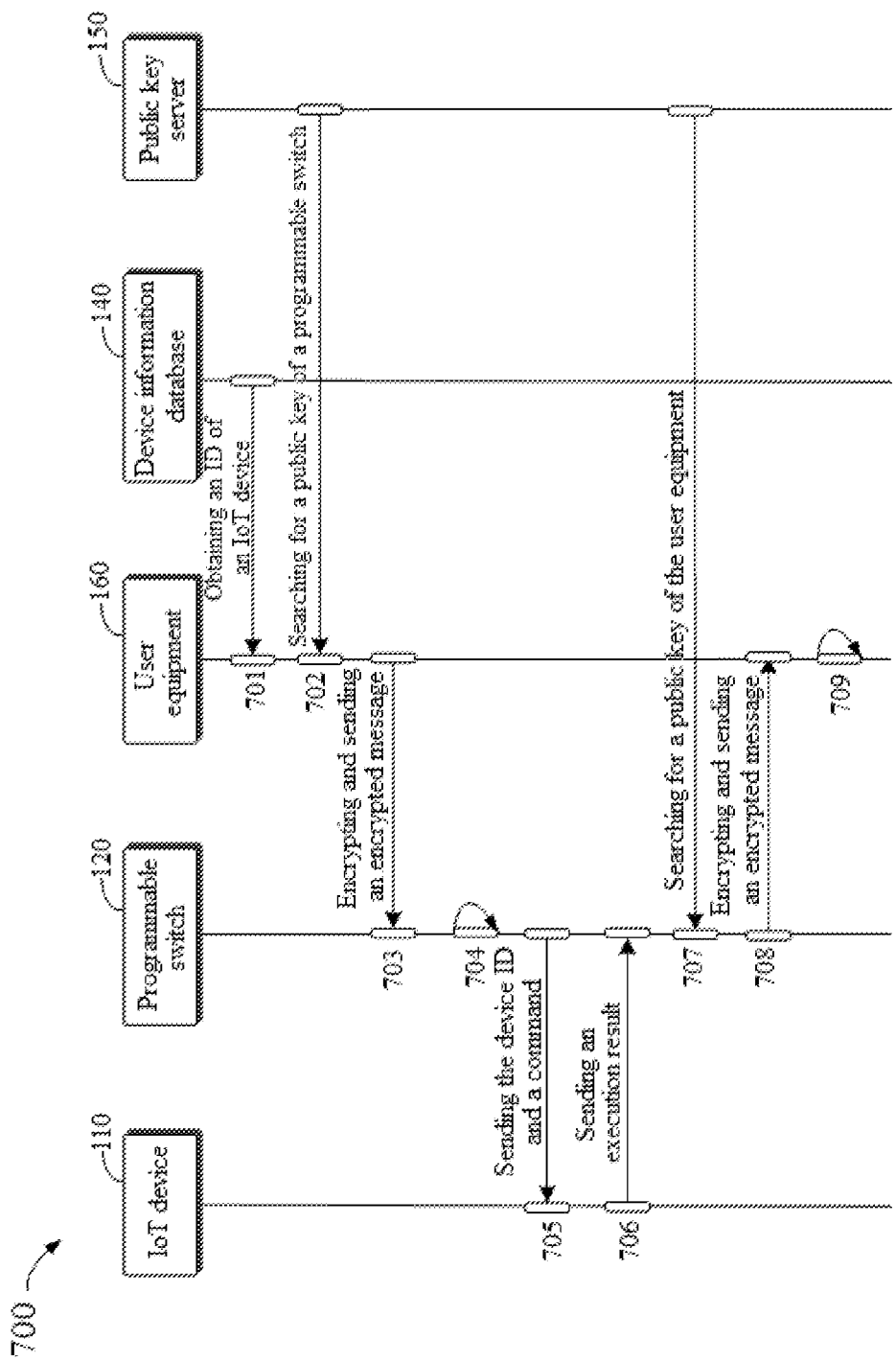
FIG. 7 shows a schematic diagram of a process of communication between user equipment and an IoT device according to an embodiment of the present disclosure.

FIG. 7 shows a schematic diagram of process 700 of communication between user equipment 160 and IoT device 110 according to an embodiment of the present disclosure, which uses a programmable switch to implement communication of the RSA algorithm, wherein the RSA algorithm will run on programmable switch 120 instead of IoT device 110.

Referring to FIG. 7, when user equipment 160 (for example, an application in the user equipment) needs to communicate with IoT device 110, it obtains (701) the device ID of IoT device 110 from device information database 140.

User equipment 160 searches for (702) a public key of programmable switch 120 from public key server 150. For example, the public key may be obtained based on the identity of programmable switch 120.

User equipment 160 uses the public key of programmable switch 120 to encrypt the device ID and an execution command "CMD," and sends (703) an encrypted message to programmable switch 120.

After receiving the encrypted message, programmable switch 120 uses its private key to perform RSA decryption (704) to obtain the device ID and the execution command, thereby determining that the IoT device with the device ID needs to execute the command.

Programmable switch 120 sends (705) the device ID and the execution command to IoT device 110.

IoT device 110 executes the command and sends (706) the device ID and an execution result to programmable switch 120.

After receiving the execution result, programmable switch 120 searches for (707) a public key of user equipment 160 from public key server 150.

Programmable switch 120 uses the public key of user equipment 160 to encrypt the execution result, and sends (708) an encrypted message to user equipment 160.

After receiving the encrypted message, user equipment 160 performs RSA decryption (709) on the encrypted message using its private key, thereby obtaining the execution result of IoT device 110.

Therefore, the embodiments according to the present disclosure not only can ensure secure communication of IoT devices, but also can improve communication speed and reduce latency due to RSA operations. According to the embodiments of the present disclosure, the RSA algorithm can be successfully implemented on a programmable switch. The embodiments of the present disclosure can reduce the actual millisecond level for RSA calculation to a microsecond level. In addition, with a programmable switch, secure communications can also be established between IoT devices that cannot implement the RSA algorithm.

In addition, the programmable functions of the programmable switch are usually written in a certain programming language, such as P4 language, which may not support some operations in the RSA algorithm. For example, the division "/" and modulo "%" operations are not supported, and thus "val1/val2" and "val1% val2" are not supported, while the RSA algorithm requires "%" operations on 2048-bit variables. Therefore, some operations in the RSA algorithm need to be redesigned to be implemented using a specific programming language in a programmable switch. For example, an embodiment of the present disclosure redesigns the processing methods for the above operations in P4 language, and simulates these operations with basic operators.

In addition, programmable switches do not support "%" operations that complete 1024 redesigns in a packeting process. Therefore, in an embodiment of the present disclosure, the resubmit mechanism of the programmable switch is iteratively utilized to complete 1024 "%" operations.

Figure 8:
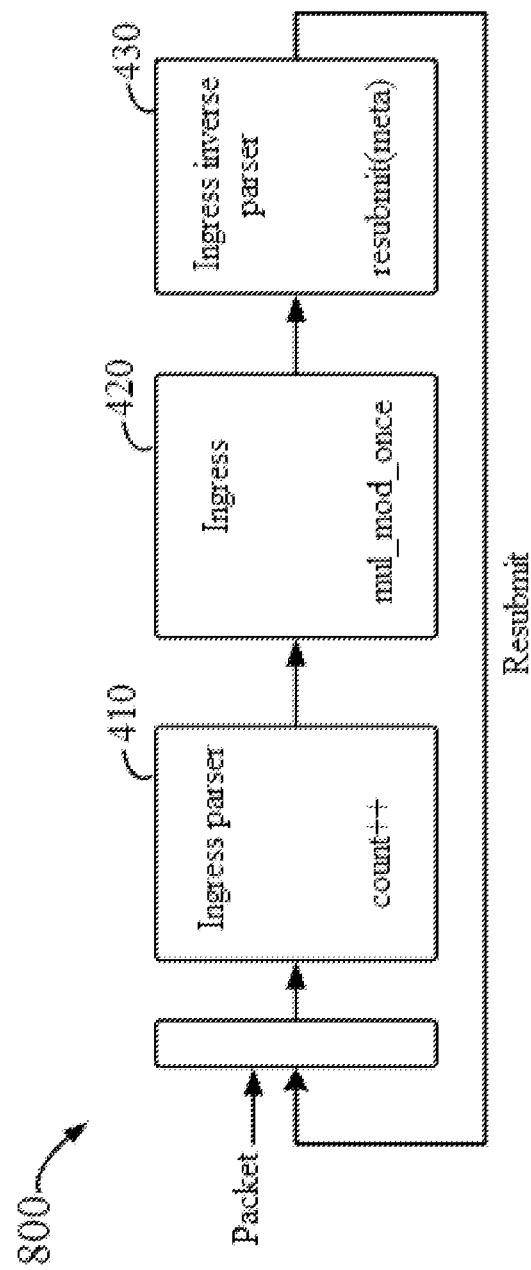
FIG. 8 shows a schematic diagram of a process of loop executions according to the present disclosure.

FIG. 8 shows a schematic diagram of process 800 of loop executions according to the present disclosure. As shown in FIG. 8, after receiving the packet, a counter can be incremented at 410 (count ++), a modulo operation can be performed once at 420 (mul_mod_once), and then resubmitting is performed at 430 (resubmit(meta)). Therefore, in an embodiment of the present disclosure, multiple "%" operations can be completed by resubmitting.

Figure 9:
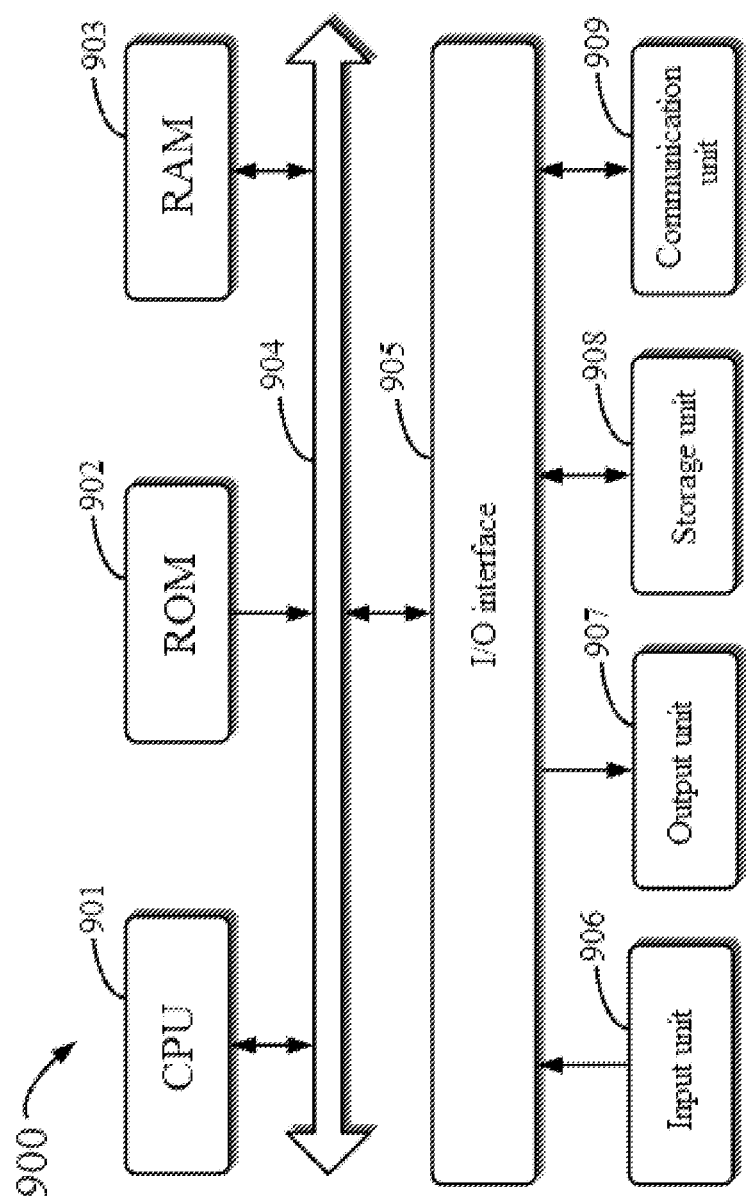
FIG. 9 shows a schematic block diagram of a device that can be used to implement embodiments of the present disclosure.

FIG. 9 shows a schematic block diagram of device 900 that can be used to implement embodiments of the present disclosure. Device 900 may be a device or an apparatus described in the embodiments of the present disclosure. As shown in FIG. 9, device 900 includes central processing unit (CPU) 901 that can perform various appropriate actions and processing according to computer program instructions stored in read-only memory (ROM) 902 or computer program instructions loaded into random access memory (RAM) 903 from storage unit 908. In RAM 903, various programs and data required for the operation of device 900 can also be stored. CPU 901, ROM 902, and RAM 903 are connected to each other via bus 904. Input/output (I/O) interface 905 is also connected to bus 904.

A plurality of components in device 900 are connected to I/O interface 905, including: input unit 906, e.g., a keyboard, a mouse, etc.; output unit 907, e.g., various types of displays, speakers, etc.; storage unit 908, e.g., a magnetic disk, an optical disk, etc.; and communication unit 909, e.g., a network card, a modem, a wireless communication transceiver, etc. Communication unit 909 allows device 900 to exchange information/data with other devices over a computer network such as the Internet and/or various telecommunication networks.

Various methods or processes described above may be carried out by processing unit 901. For example, in some embodiments, the method may be implemented as a computer software program that is tangibly contained in a machine-readable medium, e.g., storage unit 908. In some embodiments, some or all of the computer program may be loaded and/or installed on device 900 via ROM 902 and/or communication unit 909. When the computer program is loaded into RAM 903 and executed by CPU 901, one or more steps or actions in the methods or processes described above may be performed.

In some embodiments, the methods and processes described above may be implemented as a computer program product. The computer program product may include a computer-readable storage medium on which computer-readable program instructions for implementing various aspects of the present disclosure are loaded.

The computer-readable storage medium may be a tangible device that can hold and store instructions used by an instruction-executing device. The computer-readable storage medium, for example, may be, but is not limited to, an electric storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or a protruding structure within a groove on which instructions are stored, and any suitable combination of the above. The computer-readable storage medium used herein is not to be interpreted as transient signals per se, such as radio waves or other freely propagating electromagnetic waves, electromagnetic waves propagated through waveguides or other transmission media (e.g., light pulses propagated through fiber optic cables), or electrical signals transmitted through electrical wires.

The computer-readable program instructions described herein can be downloaded from the computer-readable storage medium to various computing/processing devices, or downloaded to an external computer or an external storage device over a network, e.g., the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage media in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages. The programming languages include object-oriented programming languages and conventional procedural programming languages. The computer-readable program instructions can be completely executed on a user's computer, partially executed on a user's computer, executed as a separate software package, partially executed on a user's computer and partially executed on a remote computer, or completely executed on a remote computer or a server. In cases involving a remote computer, the remote computer can be connected to a user's computer over any kind of networks, including a local area network (LAN) or a wide area network (WAN), or it can be connected to an external computer (e.g., over the Internet by using an Internet service provider). In some embodiments, an electronic circuit, for example, a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

These computer-readable program instructions can be provided to a general-purpose computer, a special-purpose computer, or a processing unit of another programmable data processing apparatus, thereby producing a machine such that, when these instructions are executed by the computer or the processing unit of another programmable data processing apparatus, an apparatus for implementing functions/actions specified in one or more blocks of the flowcharts and/or block diagrams is produced. These computer-readable program instructions may also be stored in a computer-readable storage medium, and these instructions cause a computer, a programmable data processing apparatus and/or another device to work in a specific manner. Therefore, the computer-readable medium storing instructions includes an article of manufacture that includes instructions for implementing various aspects of the functions/actions specified in one or more blocks of the flowcharts and/or block diagrams.

The computer-readable program instructions may also be loaded onto a computer, another programmable data processing apparatus, or another device, such that a series of operation steps are performed on the computer, another programmable data processing apparatus, or another device, to produce a computer-implemented process. Therefore, the instructions executed on the computer, another programmable data processing apparatus, or another device implement the functions/actions specified in one or more blocks of the flowcharts and/or block diagrams.

The flowcharts and block diagrams in the accompanying drawings show the architecture, functions, and operations of possible implementations of the device, the method and the computer program product according to a plurality of embodiments of the present disclosure. In this regard, each block in the flowcharts or block diagrams may represent a module, a program segment, or a part of instructions, which contains one or more executable instructions for implementing specified logical functions. In some alternative implementations, the functions designated in the blocks may also occur in an order different from that designated in the drawings. For example, two consecutive blocks may actually be implemented substantially in parallel, and sometimes they may also be implemented in a reverse order, depending on the functions involved. It should also be noted that each block in the block diagrams and/or flowcharts, and combinations of blocks in the block diagrams and/or flowcharts can be implemented with a dedicated hardware-based system that performs specified functions or actions, or with a combination of dedicated hardware and computer instructions.

Although various embodiments of the present disclosure have been described above, the above description is exemplary but not exhaustive, and is not limited to various embodiments disclosed. Many modifications and variations will be apparent to a person of ordinary skill in the art without departing from the scope and spirit of various embodiments described. The terms used herein are chosen to best explain the principles and practical applications of various embodiments or the technical improvements to technologies in the market, or to otherwise enable another person of ordinary skill in the art to understand various embodiments disclosed herein.

What is claimed is:

1. A method, comprising:
   receiving, at a programmable switch, encrypted data directed to an Internet of Things (IoT) device, the encrypted data being encrypted using a public key of the programmable switch;
   decrypting the encrypted data using a private key of the programmable switch to obtain decrypted data; and
   sending the decrypted data from the programmable switch to the IoT device;
   wherein the private key is set based at least in part on input from the IoT device and associated in the programmable switch with a designated source address of a source different from the IoT device;
   wherein the decrypting of the encrypted data using the private key is triggered responsive to a determination by the programmable switch that the encrypted data was received from the source address; and
   wherein the programmable switch comprises an edge switch of an edge device configured to couple the IoT device to a network, the edge switch implementing a plurality of serverless functions including at least a first serverless function for performing encryption operations in the edge switch and a second serverless function for performing decryption operations in the edge switch;
   the method further comprising:
   receiving, from the IoT device, a decryption request for one or more packets having the source address, the decryption request being received prior to receipt of a given one of the one or more packets from the source address;
   based on a determination that the given packet is received from the source address, decrypting the given packet by the programmable switch; and
   performing online authentication of the IoT device via the programmable switch utilizing an additional cryptographic function implemented in the programmable switch.

2. The method of claim 1, wherein the encrypted data is received from user equipment, and the decrypted data contains an execution command, the method further comprising:
   receiving an execution result of the execution command from the IoT device;
   encrypting the execution result using a public key of the user equipment; and
   sending the encrypted execution result to the user equipment.

3. The method of claim 1, wherein performing online authentication of the IoT device via the programmable switch utilizing an additional cryptographic function implemented in the programmable switch comprises:
   authenticating the IoT device online by implementing an asymmetric encryption function for the IoT device in the programmable switch.

4. The method of claim 3, wherein authenticating the IoT device online comprises:
   receiving a device identifier of the IoT device and a token for authentication from the IoT device;
   encrypting the device identifier and the token using a public key of an authentication server;
   sending the device identifier and the token that are encrypted to the authentication server; and
   receiving an authentication response message from the authentication server, the authentication response message being encrypted using the public key of the programmable switch.

5. The method of claim 4, wherein authenticating the IoT device online further comprises:
   decrypting the authentication response message using the private key of the programmable switch to obtain an authentication result; and
   based on a determination that the authentication result indicates that the IoT device has passed the authentication:
   granting an access right to the IoT device;
   storing the device identifier of the IoT device and a corresponding port; and
   sending an indication of authentication success to the IoT device.

6. The method of claim 1, further comprising:
   sending, based on a determination that a request for a serverless list is received from the IoT device, the serverless list to the IoT device;

receiving, from the IoT device, an encryption request for one or more packets associated with a destination address; and based on a determination that a given packet directed to the destination address is received from the IoT device, encrypting the given packet by the programmable switch.

7. The method of claim 1, further comprising:

generating an asymmetric key using a processing unit in the programmable switch, the asymmetric key including the public key and private key of the programmable switch; and performing at least one of asymmetric encryption and asymmetric decryption using a programmable switch chip in the programmable switch.

8. A programmable switch, comprising:

a processing unit; and a memory coupled to the processing unit and storing instructions that, when executed by the processing unit, perform the following actions:

receiving encrypted data directed to an Internet of Things (IoT) device, the encrypted data being encrypted using a public key of the programmable switch;

decrypting the encrypted data using a private key of the programmable switch to obtain decrypted data; and sending the decrypted data to the IoT device;

wherein the private key is set based at least in part on input from the IoT device and associated in the programmable switch with a designated source address of a source different from the IoT device;

wherein the decrypting of the encrypted data using the private key is triggered responsive to a determination by the programmable switch that the encrypted data was received from the source address; and wherein the programmable switch comprises an edge switch of an edge device configured to couple the IoT device to a network, the edge switch implementing a plurality of serverless functions including at least a first serverless function for performing encryption operations in the edge switch and a second serverless function for performing decryption operations in the edge switch;

the actions further comprising:

receiving, from the IoT device, a decryption request for one or more packets having the source address, the decryption request being received prior to receipt of a given one of the one or more packets from the source address;

based on a determination that the given packet is received from the source address, decrypting the given packet by the programmable switch; and performing online authentication of the IoT device via the programmable switch utilizing an additional cryptographic function implemented in the programmable switch.

9. The programmable switch of claim 8, wherein the encrypted data is received from user equipment, the decrypted data contains an execution command, and the actions further comprise:

receiving an execution result of the execution command from the IoT device;

encrypting the execution result using a public key of the user equipment; and sending the encrypted execution result to the user equipment.

10. The programmable switch of claim 8, wherein performing online authentication of the IoT device via the programmable switch utilizing an additional cryptographic function implemented in the programmable switch comprises:

authenticating the IoT device online by implementing an asymmetric encryption function for the IoT device in the programmable switch.

11. The programmable switch of claim 10, wherein authenticating the IoT device online comprises:

receiving a device identifier of the IoT device and a token for authentication from the IoT device;

encrypting the device identifier and the token using a public key of an authentication server;

sending the device identifier and the token that are encrypted to the authentication server; and receiving an authentication response message from the authentication server, the authentication response message being encrypted using the public key of the programmable switch.

12. The programmable switch of claim 11, wherein authenticating the IoT device online further comprises:

decrypting the authentication response message using the private key of the programmable switch to obtain an authentication result; and based on a determination that the authentication result indicates that the IoT device has passed the authentication:

granting an access right to the IoT device;

storing the device identifier of the IoT device and a corresponding port; and sending an indication of authentication success to the IoT device.

13. The programmable switch of claim 8, wherein the actions further comprise:

sending, based on a determination that a request for a serverless list is received from the IoT device, the serverless list to the IoT device;

receiving, from the IoT device, an encryption request for one or more packets associated with a destination address; and based on a determination that a given packet directed to the destination address is received from the IoT device, encrypting the given packet by the programmable switch.

14. The programmable switch of claim 8, further comprising:

a processing unit configured to generate an asymmetric key that includes the public key and private key of the programmable switch; and a programmable switch chip configured to perform at least one of asymmetric encryption and asymmetric decryption.

15. A computer program product that is tangibly stored on a non-transitory computer-readable medium and contains computer-executable instructions that, when executed, cause a computer to implement a method, the method comprising:

receiving, at a programmable switch, encrypted data directed to an Internet of Things (IoT) device, the encrypted data being encrypted using a public key of the programmable switch;

decrypting the encrypted data using a private key of the programmable switch to obtain decrypted data; and sending the decrypted data from the programmable switch to the IoT device;

wherein the private key is set based at least in part on input from the IoT device and associated in the programmable switch with a designated source address of a source different from the IoT device;

wherein the decrypting of the encrypted data using the private key is triggered responsive to a determination by the programmable switch that the encrypted data was received from the source address; and wherein the programmable switch comprises an edge switch of an edge device configured to couple the IoT device to a network, the edge switch implementing a plurality of serverless functions including at least a first serverless function for performing encryption operations in the edge switch and a second serverless function for performing decryption operations in the edge switch;

the method further comprising:

receiving, from the IoT device, a decryption request for one or more packets having the source address, the decryption request being received prior to receipt of a given one of the one or more packets from the source address;

based on a determination that the given packet is received from the source address, decrypting the given packet by the programmable switch; and performing online authentication of the IoT device via the programmable switch utilizing an additional cryptographic function implemented in the programmable switch.

16. The computer program product of claim 15, wherein the encrypted data is received from user equipment, and the decrypted data contains an execution command, the method further comprising:

receiving an execution result of the execution command from the IoT device;

encrypting the execution result using a public key of the user equipment; and sending the encrypted execution result to the user equipment.

17. The computer program product of claim 15, wherein performing online authentication of the IoT device via the programmable switch utilizing an additional cryptographic function implemented in the programmable switch comprises:

authenticating the IoT device online by implementing an asymmetric encryption function for the IoT device in the programmable switch.

18. The computer program product of claim 17, wherein authenticating the IoT device online comprises:

receiving a device identifier of the IoT device and a token for authentication from the IoT device;

encrypting the device identifier and the token using a public key of an authentication server;

sending the device identifier and the token that are encrypted to the authentication server; and receiving an authentication response message from the authentication server, the authentication response message being encrypted using the public key of the programmable switch.

19. The computer program product of claim 15, wherein the method further comprises:

sending, based on a determination that a request for a serverless list is received from the IoT device, the serverless list to the IoT device;

receiving, from the IoT device, an encryption request for one or more packets associated with a destination address; and based on a determination that a given packet directed to the destination address is received from the IoT device, encrypting the given packet by the programmable switch.

20. The computer program product of claim 15, wherein the method further comprises:

generating an asymmetric key using a processing unit in the programmable switch, the asymmetric key including the public key and private key of the programmable switch; and performing at least one of asymmetric encryption and asymmetric decryption using a programmable switch chip in the programmable switch.

* * * * *